(12) United States Patent
Huang

(10) Patent No.: US 7,218,681 B2
(45) Date of Patent: May 15, 2007

(54) METHOD AND APPARATUS FOR CROSS-TALK MITIGATION THROUGH JOINT MULTIUSER ADAPTIVE PRE-CODING

(75) Inventor: Gang Huang, Highlands, NJ (US)

(73) Assignee: Agere Systems Inc., Allentown, PA (US)

( * ) Notice: Subject to any disclaimer, the term of this patent is extended or adjusted under 35 U.S.C. 154(b) by 816 days.

(21) Appl. No.: 09/975,682

(22) Filed: Oct. 11, 2001

(65) Prior Publication Data

US 2003/0072380 A1    Apr. 17, 2003

(51) Int. Cl.
*H04K 1/02* (2006.01)

(52) U.S. Cl. .................. 375/296; 375/285

(58) Field of Classification Search ............ 375/229, 375/231, 232, 261, 285, 295, 296, 346; 455/63.1, 455/114.2, 114.3; 332/159
See application file for complete search history.

(56) References Cited

U.S. PATENT DOCUMENTS

| | | | |
|---|---|---|---|
| 6,055,268 A * | 4/2000 | Timm et al. ............ | 375/229 |
| 6,314,135 B1 * | 11/2001 | Schneider et al. ......... | 375/232 |
| 6,400,761 B1 * | 6/2002 | Smee et al. ............. | 375/232 |
| 6,680,978 B1 * | 1/2004 | Schneider et al. ......... | 375/242 |
| 2001/0004383 A1 * | 6/2001 | Nordstrom et al. ........ | 375/222 |
| 2003/0086514 A1 * | 5/2003 | Ginis et al. ............. | 375/346 |

* cited by examiner

*Primary Examiner*—Kevin Kim

(57) ABSTRACT

A method and apparatus for reducing cross-talk in a communication system propagating respective sets of in-phase and quadrature signals by processing at least one set of I and Q signals according to a respective pre-coding matrix and adapting the pre-coding matrix in response to differences between expected received signals and actual received signals.

29 Claims, 11 Drawing Sheets

FIG. 4 (cont. a)
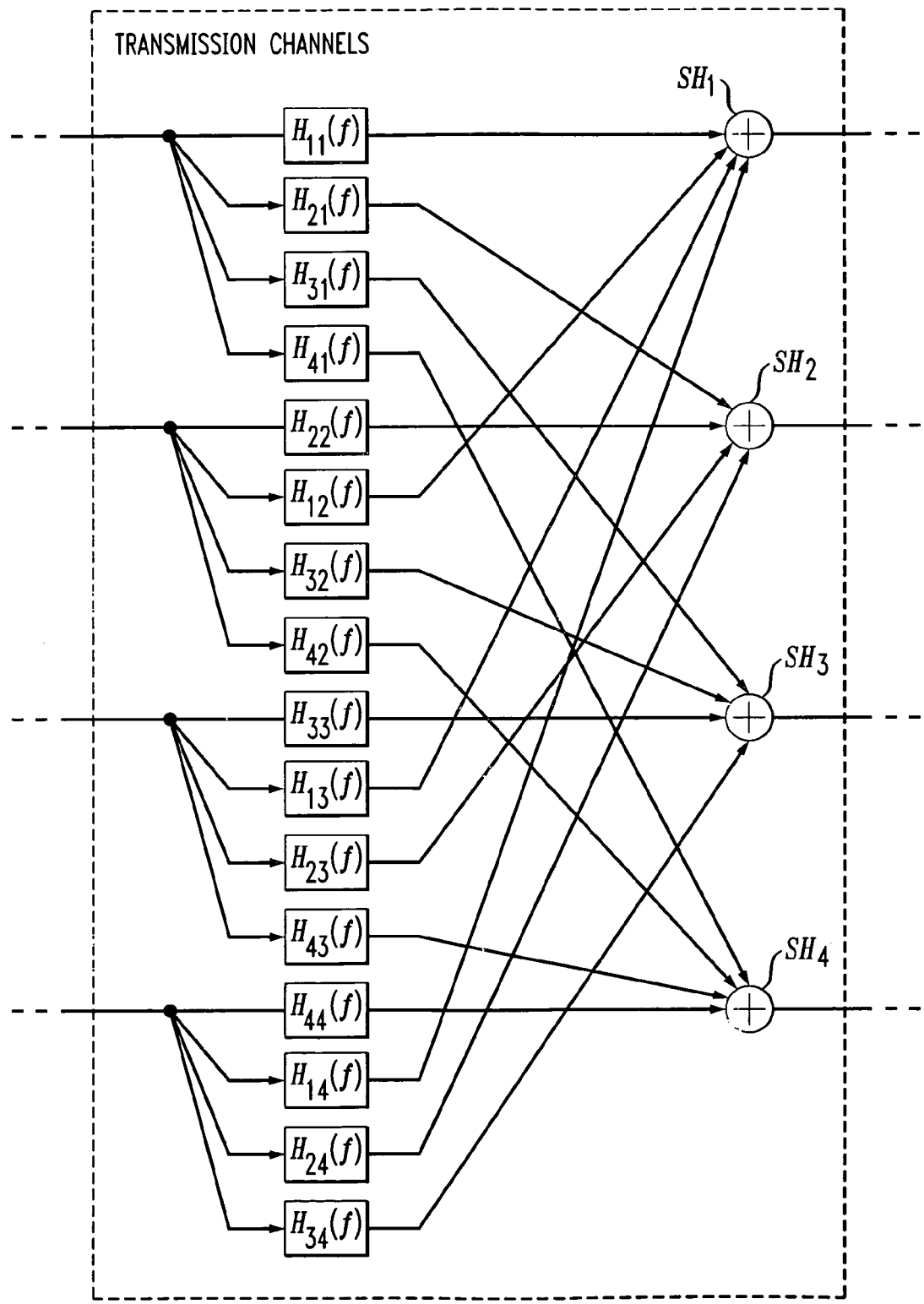

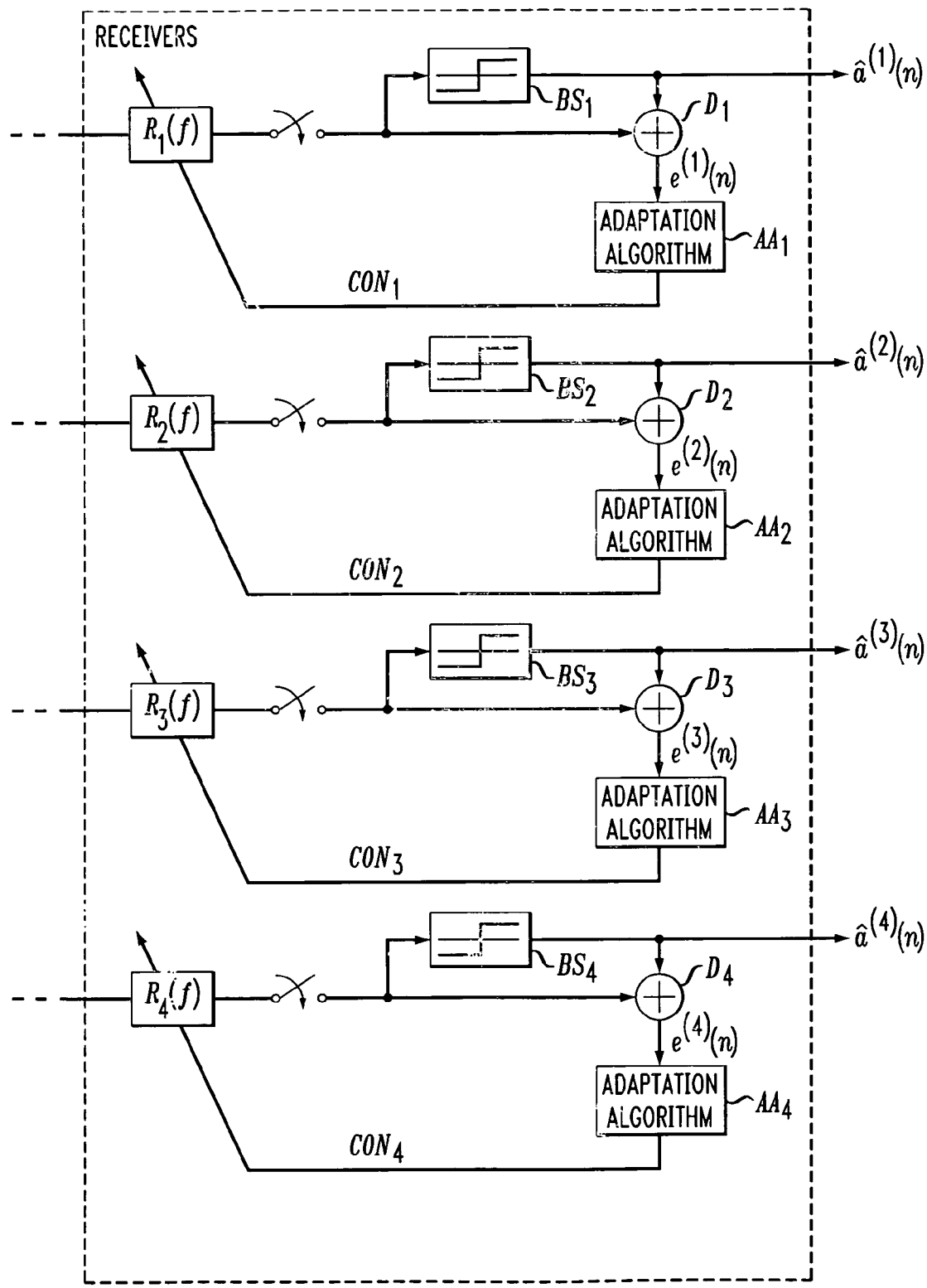
FIG. 4 (cont. b)

FIG. 5 (cont. a)
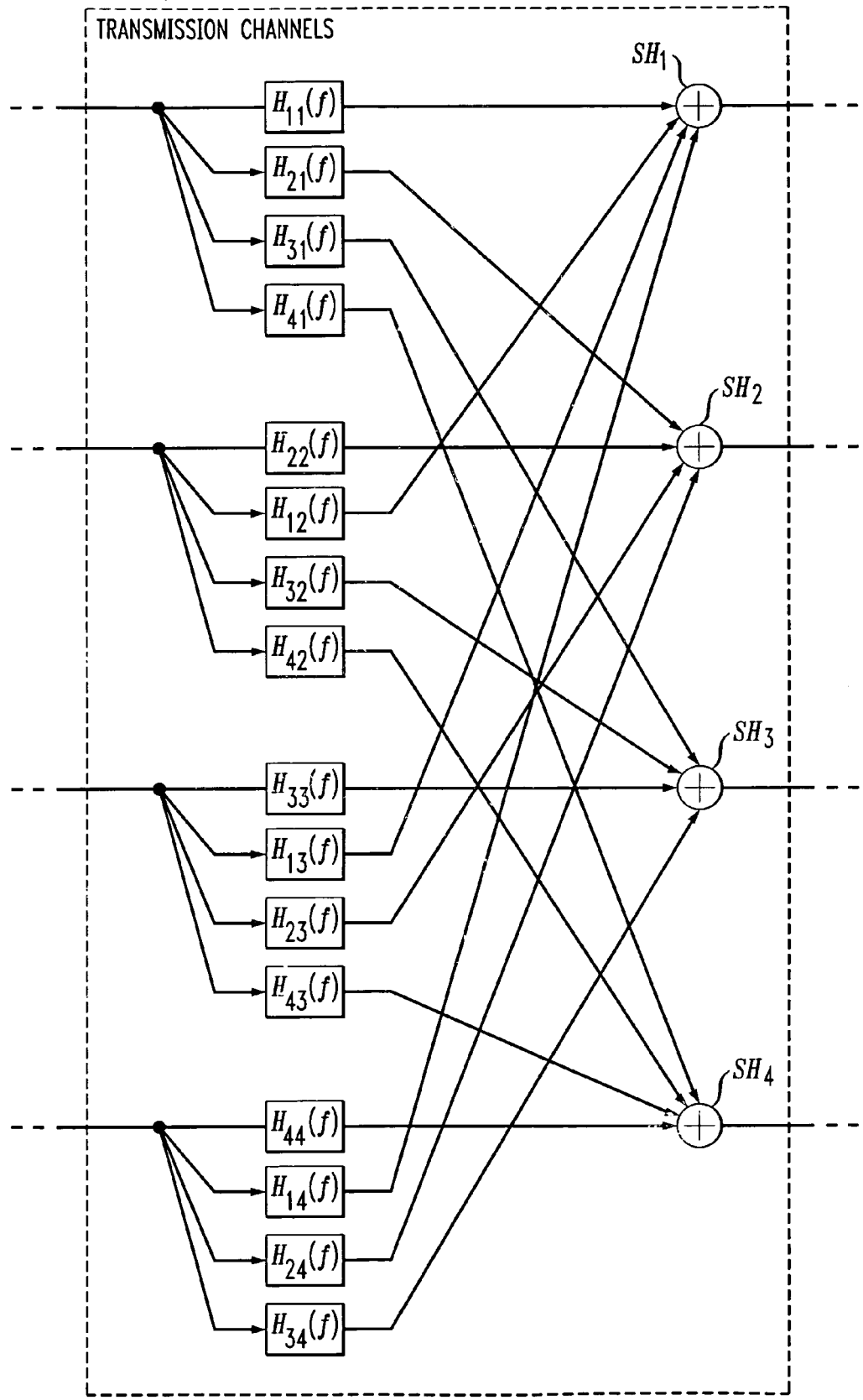

*FIG. 5 (cont. b)*
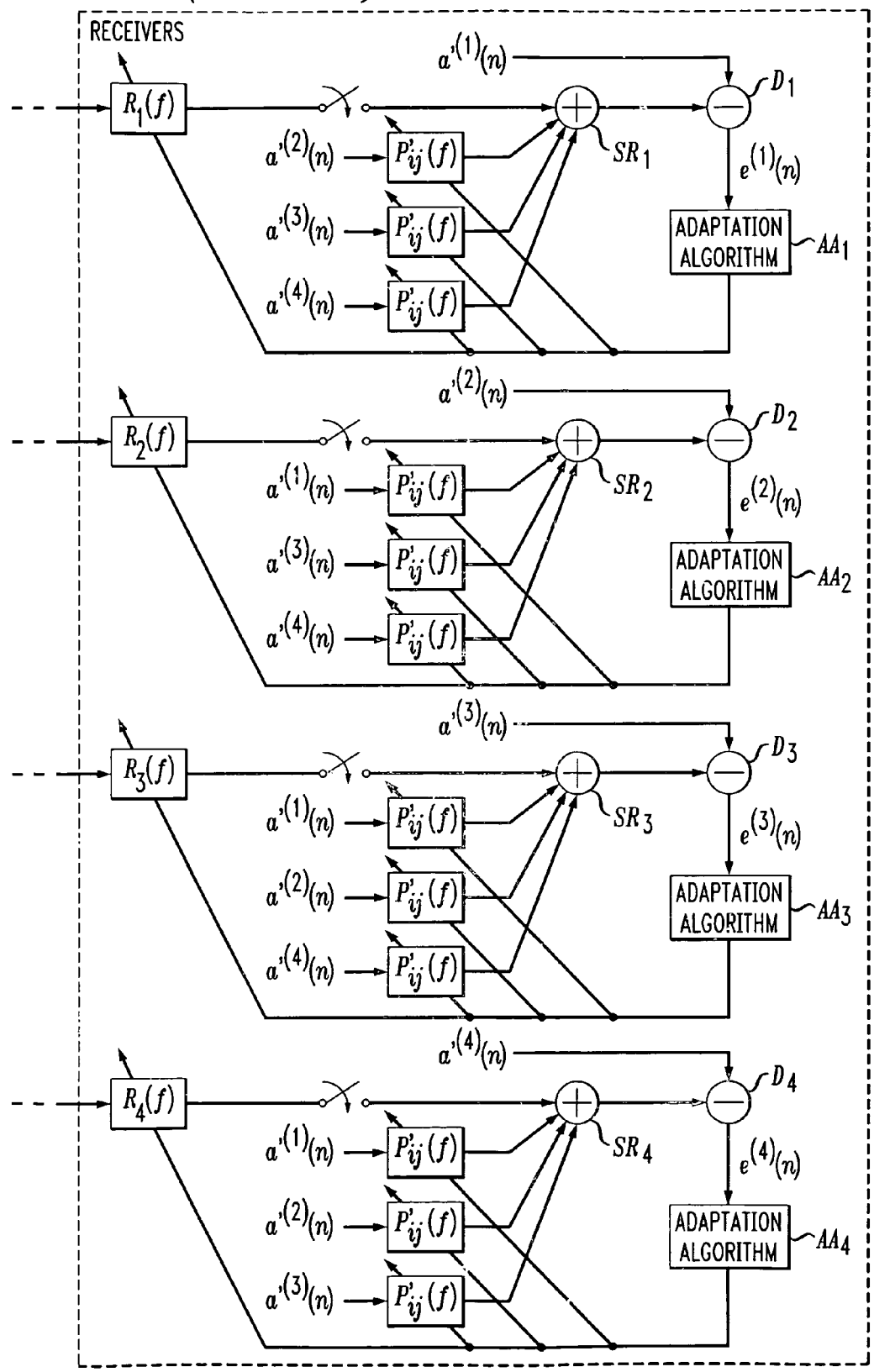

METHOD AND APPARATUS FOR CROSS-TALK MITIGATION THROUGH JOINT MULTIUSER ADAPTIVE PRE-CODING

BACKGROUND OF THE INVENTION

1. Technical Field of the Invention

This invention generally relates to the field of communication systems and, more particularly, to a method and apparatus for minimizing the effect of far-end cross-talk in a digital communication system.

2. Description of the Related Art

The speed at which digital communication systems provide users with information has grown over the years. The specific communication system used has evolved from a low data rate analog modem to the modern day high speed Digital Subscriber Line (xDSL) service. However, the physical transmission medium used to convey information to users has not changed. Typically, the transmission medium is "twisted pair" which is unshielded copper wires in close proximity to one another. Each twisted pair serves a respective user and is bundled with other twisted pairs, typically, in groups of 25 pairs.

Unfortunately, the proximity of each twisted pair to one another creates an impairment to transmitting information at a high speed. More specifically, when information is communicated on a twisted pair, the communication of that information interferes with communication on other twisted pairs. For instance, where you have a transmitting end of a circuit and multiple receiving ends, some or all of the receiving ends of the circuit can receive errors due to cross-talk from one interfering twisted pair in the bundle.

Cross-talk is especially problematic in high speed data transmission. Asymmetric Digital Subscriber Lines (ADSL), for example, offers data rates up to 8 Mb/s in the downstream direction (from the network to the home) and about one-eighth of this date rate in the upstream direction (from the home to the network). An even higher speed version of xDSL service is being developed known as Very-high-speed Digital Subscriber Lines (VDSL) that targets data rates up to about 50 Mb/s for the downstream channel. As xDSL systems provide greater speeds, the xDSL service becomes more susceptible to interferences such as cross-talk.

Most of the work in this area has focused on optimizing spectral shaping of the transmitted signal by taking into account the cable loss and cross-talk loss to maximize the signal-to-cross-talk ratio. Other cross-talk reduction methods focus on mitigating single user cross-talk. The single user cross-talk approach, however, treats cross-talk interference as colored stationary or cyclostationary noise. Other cross-talk reduction methods address the issue of multi-user detection, which treats multiple receivers as one entity and performs joint detection.

Unfortunately, conventional multi-user detection methods for xDSL applications are not practical because the users are physically separate from one another. Thus conventional methods can not adequately address the issue of multi-user cross-talk detection and correction where the users are physically separate from each other.

SUMMARY OF THE INVENTION

The invention comprises a method and apparatus for mitigating cross-talk by deliberately combining (pre-coding) transmitted signals from multiple sources so that the effect of the pre-coding offsets the effect of cross-talk and the remote receivers can independently process the received signals as if the cross-talk does not exist.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, wherever possible, to designate identical elements that are common to the figures.

DETAILED DESCRIPTION OF THE PREFERRED EMBODIMENT

The present invention will be described in the context of four users utilizing Very high rate Digital Subscriber Line (VDSL) service. However, it will be appreciated by those skilled in the art that other types of DSL services and a varying amount of users can be serviced and still fall within the scope of the invention. While the present invention is described as using Carrierless Amplitude and Phase (CAP) modulation technology, the invention can be modified to use Quadrature Amplitude Modulation (QAM) and other modulation techniques.

Figure 1:
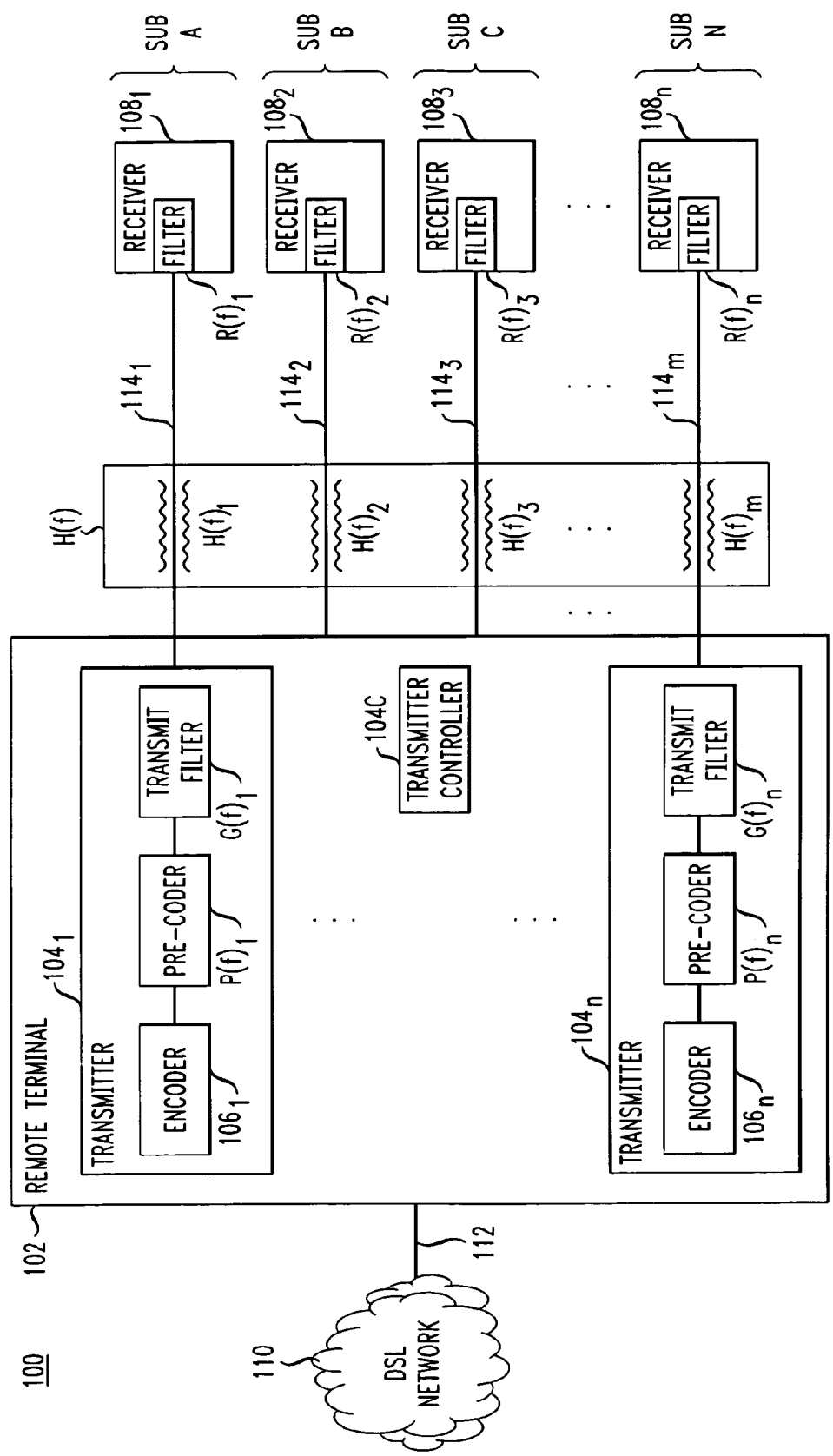
FIG. 1 depicts a high level block diagram of a communication system including the present invention.

FIG. 1 depicts a high level block diagram of a communication system including the present invention. Specifically, communication system 100 comprises a DSL network 110, a first transmission medium 112 and a remote terminal 102 housing a plurality of transmitters $104_1$ and so on up to $104_n$ (collectively transmitters 104). Each transmitter 104 has a respective encoder 106, a respective pre-coder $P(f)_1$ and a respective transmit filter $G(f)$. Each transmitter 104 communicates with a respective receiver 108 via a respective second transmission medium 114. Each of the receivers $108_1$ through $108_n$ includes a respective receive filter $R(f)$. Additionally, each receiver 108 is located at a respective subscriber A, B, C and so on up to N. Each of the respective second transmission mediums 114 are subject to respective channel impairments, generally denoted as $H(f)$. $H(f)$ comprises transmission and/or cross-talk impairment of a channel.

During the initial "turn up" of a VDSL system, each of the transmitters 104 and receivers 108 goes through a training phase. Signals are communicated between respective transmitters 104 and receivers 108, and amplitude levels and shapes of the signals are measured. The communicated signals received by the receiving device 108 are predetermined signals, and deviancies from the expected values are noted received by the receiving device 108 and communicated to the transmitting device 104.

One factor that can result in a deviancy is far end cross-talk, which results when the energy from a signal in one communications path interferes with the signal in one or more other communication paths. That is, the energy level in the interfering communication path is communicated to the "non-interfering" communication paths resulting in distortion on the "non-interfering" communication paths.

An illustrative example of far end cross-talk occurring is when a subscriber X is having a conversation with a subscriber Y on a telephone line, and subscriber X and/or Y hears the telephone conversation of a subscriber Z who is not a party to subscriber X and Y's conversation. The two signals are commingled and become distorted.

Referring to the communication system 100 of FIG. 1, a subscriber A receives an information "download" from, for example, the Internet (not shown). The downloaded information is communicated to the DSL network 110. Simultaneously, other subscribers (i.e., subscribers B, C and D) can receive the same or other information via respective downloads. The downloaded information can be data from a web page, email information and the like. The downloaded information is communicated via first transmission medium 112 to the remote terminal 102, which serves subscribers within, for example, a defined geographic region. First transmission medium 112 can be a fiber optic cable for transporting information between the DSL network 110 and remote terminal 102. Specifically, first transmission medium 112 is coupled between the DSL network 110 and each transmitter 104 via an intermediate device (not shown).

The encoder 106 performs data conversion on the downloaded information, converting the downloaded information from packets using realtime transport protocol (RTP) and the like to, illustratively, a CAP formatted signal. That is, a bit stream is converted into a symbol stream.

The CAP signal or symbol stream is, illustratively, a conventional CAP signal based on Quadrature Amplitude Modulation (QAM). In accordance with CAP, an impulse is generated which has two components. The first component is an in-phase signal while the second component is a quadrature phase signal. Each component can have a variable amplitude level, such as the four levels of the exemplary embodiment. By combining the two components, an impulse may be generated which has, illustratively, 16 unique combinations of in-phase signal amplitude and quadruture-phase signal amplitude. The 16 combinations are known as a CAP 16 constellation.

The CAP signal or symbol stream is communicated to a respective pre-coder P(f). The pre-coder P(f) imparts a pre-coding function to the CAP symbol stream and communicates the "pre-coded" CAP symbol stream to a respective transmit filter G(f). The transmit filter G(f) performs conventional wave shaping functions on the CAP symbol stream to produce a shaped CAP symbol stream. The shaped CAP symbol stream is then forwarded to a respective receiver 108 via a transmission medium 114. It is noted that the shaped CAP symbol stream is further adapted in response to a channel function $H_f$, which represents a logical signal path between the transmitter 104 and receiver 108. A receive filter R(f) at the receiver 108 shapes the received CAP symbol stream in a conventional manner. The function H(f) represents a mathematical model of the channel impairments that the shaped CAP symbol stream is subjected to as it traverses transmission medium 114. Such channel impairments include, for example, channel loss, cross-talk from other channels and the like.

As previously discussed, multiple transmitters can transmit information simultaneously. Hence, during the training period, information communicated via one communications path can cause interference to other communication paths. This is likely to occur on second transmission medium 114 which comprises, illustratively, a plurality of "twisted copper pairs" serving receivers located at separate and/or distinct locations.

Receiver 108 may receive a distorted CAP signal due to cross-talk from other transmitters. The transmitted CAP symbol stream is a predetermined signal where deviations are considered errors.

Figure 2:
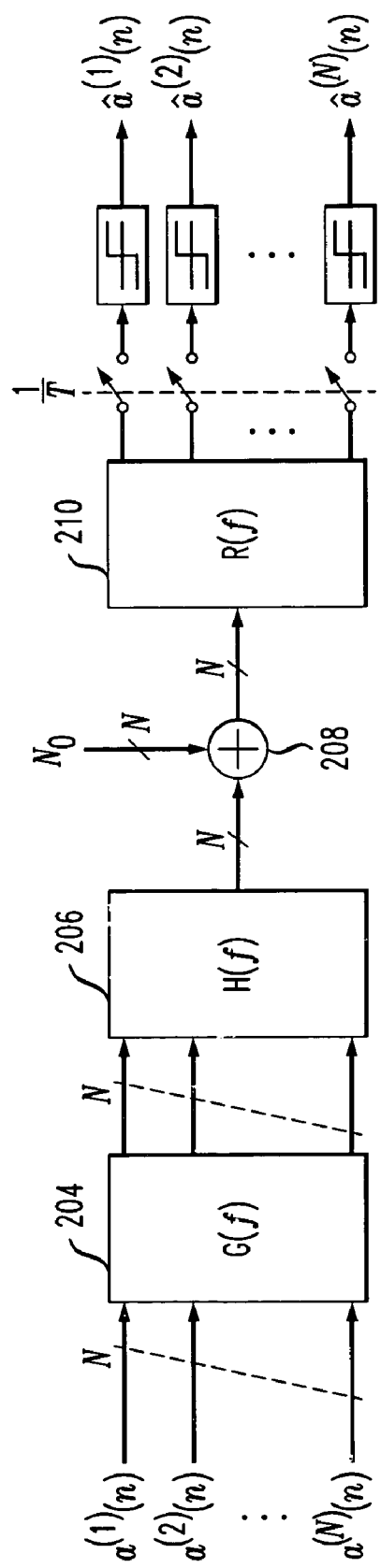
FIG. 2 depicts a block diagram of a Multiple Input Multiple Output (MIMO) system.

FIG. 2 depicts a block diagram of a Multiple Input Multiple Output (MIMO) system 200. The MIMO system 200 is an N-user data transmission system. The MIMO system 200 receives input CAP signals $a^{(1)}(n)$, $a^{(2)}(n)$ and so on up to $a^{(N)}(n)$. The MIMO system 200 comprises a transmit filter 204 which receives each of the input cap CAP signals $a^{(1)}(n)$ through $a^{(N)}(n)$ and imparts thereto a filtering function G(f), communications channels having impairments 206 which are represented by a function H(f), a summer 208 and receive filters 210 which implement a function R(f). The output of the receive filters 210 comprises output signals $a'^{(1)}(n)$, $a'^{(2)}(n)$ and so on up to $a'^{(N)}(n)$.

Using frequency domain expressions, the overall transfer function of the MIMO system 200, including transmit filters, receive filters and all direct and cross-talk channels, can be written as:

$$S(f) = R(f)H(f) \cdot G(f) \qquad \text{(equation 1)}$$

where R(f), H(f) and G(f) are all N×N matrices representing the receive filters, the channels, and the transmit filters, respectively. For purposes of simplicity, the transmit filter and receive filter for each channel are assumed to be isolated from the transmit filter and receive filter of other channels. Hence, both R(f) and G(f) are diagonal matrices. Assuming that transmit filters are identical for all channels, and that G(f) is reduced to a scalar G(f), equation 1 can be expressed as:

$$S(f) = R(f) \begin{bmatrix} H_{11}(f) & H_{12}(f) & \cdots & H_{1N}(f) \\ H_{21}(f) & H_{22}(f) & \cdots & H_{2N}(f) \\ \vdots & \vdots & \ddots & \vdots \\ H_{N1}(f) & H_{N2}(f) & \cdots & H_{NN}(f) \end{bmatrix} \cdot G(f) \qquad \text{(equation 2)}$$

where $H_{ii}(f)$ represents the direct transfer functions for the ith communication link or user, and $H_{ij}(f), i \neq j$, represents the cross-talk transfer functions between the transmitter of user j and the receiver of user i.

Compensating for the cross-talk. a matrix P(f) directed as a pre-coding matrix is introduced and given as:

$$P(f) = \begin{bmatrix} 1 & P_{12}(f) & \cdots & P_{1N}(f) \\ P_{21}(f) & 1 & \cdots & P_{2N}(f) \\ \vdots & \vdots & \ddots & \vdots \\ P_{N1}(f) & P_{N2}(f) & \cdots & 1 \end{bmatrix} \quad \text{(equation 3)}$$

such that $$\begin{aligned} S(f) &= R(f)H(f) \cdot [G(f)P(f)] \quad \text{(equation 4)} \\ &= R(f)H(f)P(f) \cdot G(f) \\ &= R(f) \begin{bmatrix} K_1(f) & 0 & \cdots & 0 \\ 0 & K_2(f) & \cdots & 0 \\ \vdots & \vdots & \ddots & \vdots \\ 0 & 0 & \cdots & K_N(f) \end{bmatrix} \cdot G(f) \end{aligned}$$

where $$\begin{bmatrix} K_1(f) & 0 & \cdots & 0 \\ 0 & K_2(f) & \cdots & 0 \\ \vdots & \vdots & \ddots & \vdots \\ 0 & 0 & \cdots & K_N(f) \end{bmatrix} = H(f)P(f) \quad \text{(equation 5)}$$

Since R(*f*) is also a diagonal matrix, the overall system transfer function corresponds to a diagonal matrix. Thus, the introduction of matrix P(*f*) completely eliminates the effect of far-end cross-talk.

For example, in a system of two-users, P(*f*) is found by solving the following equation:

$$\begin{bmatrix} 1 & P_{12}(f) \\ P_{21}(f) & 1 \end{bmatrix} \cdot \begin{bmatrix} H_{11}(f) & H_{12}(f) \\ H_{21}(f) & H_{22}(f) \end{bmatrix} = \begin{bmatrix} K_1(f) & 0 \\ 0 & K_2(f) \end{bmatrix} \quad \text{(equation 6)}$$

or $$\{H_{12}(f) + P_{12}(f)H_{22}(f) = 0 \Rightarrow \left\{ P_{12}(f) = \frac{-H_{12}(f)}{H_{22}(f)} \right. \quad \text{(equation 7)}$$

$$\{P_{21}(f)H_{11}(f) + H_{21}(f) = 0 \Rightarrow \left\{ P_{21}(f) = \frac{-H_{++21}(f)}{H_{11}(f)} \right.$$

In an N-user system, a $N^2-N$ equation can be constructed to solve the $N^2-N$ transfer functions of the P(*f*) matrix. Therefore, it is always possible to find P(*f*), from H(*f*) as long as H(*f*) is non-singular. In most real-world systems however, the transfer functions H(*f*) are either unknown, or unpractical to obtain. A practical means of obtaining a matrix P(*f*) that satisfies Eq. (5) is to use the iterative approach described below with respect to FIG. 3.

Figure 3:
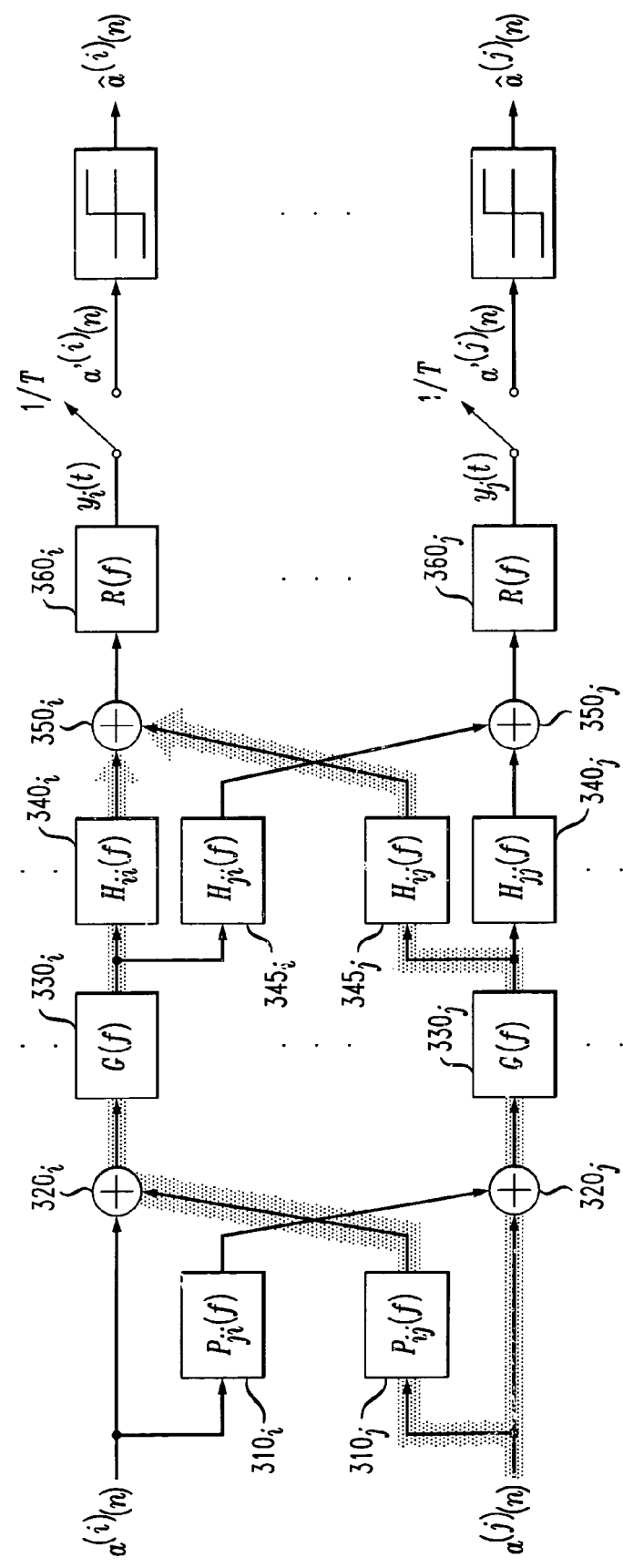
FIG. 3 depicts an illustrative example of interference between communication channels in the communication system of FIG. 1.

FIG. 3 depicts an illustrative example of interference between communication channels such as those depicted in the communication system of FIG. 1. Specifically, FIG. 3 depicts a functional representation of two communication channels in which interference is imparted from at least one channel to the other. A first communication channel i comprises a pre-coder function $310_i$, a summer function $320_i$, a transmit filter function $330_i$, a first channel impairment function $340_i$, a second channel impairment function $345_i$, a second summer $350_i$, a received filter function $360_i$. Similarly, the second channel j comprises a pre-coder function $310_j$, a summer function $320_j$, a transmit filter function $330_j$, a first channel impairment function $340_j$, a second channel impairment function $345_j$, a second summer $350_j$, a received filter function $360_j$.

Each of the channels i and j receive a respective transmit CAP signal or symbol stream, denoted as $a^{(i)}(n)$ and $a^{(j)}(n)$, respectively. Each received transmit CAP symbol stream is coupled to the respective pre-coder function 310 and a first input of the summer function 320. The output of each pre-coder function 310 is coupled to a second input of the summer function of the opposite channel. That is, the output of decoder function $310_i$ is coupled to a second input of summer function $320_j$, while the output of pre-coder function $310_j$ is coupled to a second input of summer function $320_i$. The output of each of the first summer functions 320 is coupled to the respective transmit filter function 330. The outputs of the respective transmit filter functions 330 are coupled to respective inputs of respective channel impairment functions 340 and 345. The output of respective channel impairment functions 340 are coupled to first inputs of respective second summer functions 350. The output of channel impairment function $345_i$ is coupled to a second input of second summer function $350_j$. The output of second channel impairment function $345_j$ is coupled to a second input of second summer function $350_i$. The output of the second summer functions 350 is coupled to channel respective inputs of receiver functions 360. The output of the respective receiver filter functions 360 comprises output signals $a'^{(i)}(n)$ and $a'^{(j)}(n)$. These output signals may be switched at a rate of 1/T to produce corresponding signals $â^i(n)$ and $â^j(n)$.

Since H(*f*) is unknown, direct computation of P(*f*) is not feasible, since the matrix P(f) depends on the impairment matrix H(f). However, P(*f*) is found based on iterative methods according to an embodiment of the invention. By starting with P̃(*f*) in place of P(f) and varying P̃(*f*) until the mean-square-error at the slicer of receiver 108 is minimized, then P̃(*f*) is a reasonable first approximation of P(*f*). H(*f*) cannot necessarily be predicted accurately. A predetermined CAP signal has to be transmitted and the received CAP signal can be measured to determine errors in the received CAP signal.

Illustratively, for channel i, the transmitted CAP signal $a^{(1)}(n)$, after propagating through the channel, is sampled as $a'^{(1)}(n)$ at the receiver. The difference between the transmitted CAP signal and the received CAP signal is the difference error. The CAP signal for signal j causes interchannel interference with channel i. If the error is caused by the interference from channel j, through the cross-talk transfer function $H_{ij}(f)$ (i.e., $345_j$), this error information can be used to adjust the pre-coder $P_{ij}(f)$, (i.e., $310_j$).

The two shaded paths in FIG. 3 illustrate interchannel interference. In the first shaded path, transmit signal $a^{(j)}(n)$ propagates through channel j by a path comprising summer function $320_j$, transmit filter function $330_j$, second channel impairment function $345_j$ and data slicer function $350_i$. At second summer function $350_i$, the two CAP signal symbol streams are commingled and received via receiver function $360_i$.

The difference between the expected signal shape and level and the actual received signal shape and level is determined. In a second shaded path, a pre-coded CAP signal provided by pre-coder function $310_j$ is propagated through a path comprising summer $320_i$, transmit filter function $330_i$, and first channel I impairment function $340_i$ (i.e., $H_{ii}(f)$) and to second I channel summer function $350_i$.

FIG. 3 shows that the effect of pre-coding transfer function $P_{ij}(f)$ ($310_i$) is to cancel the effect due to the cross-talk transfer function $H_{ij}(f)$ ($345_j$). The sum of the two paths should be zero. Specifically, $P_{ij}$ is adjusted so that the difference between the two signals become zero. That is the two paths should have the opposite transfer function resulting in a sum of zero. Hardware and/or software suitable for realizing the pre-coder function may be implemented using techniques similar to those used for implementing an adaptive canceler.

Figure 4:
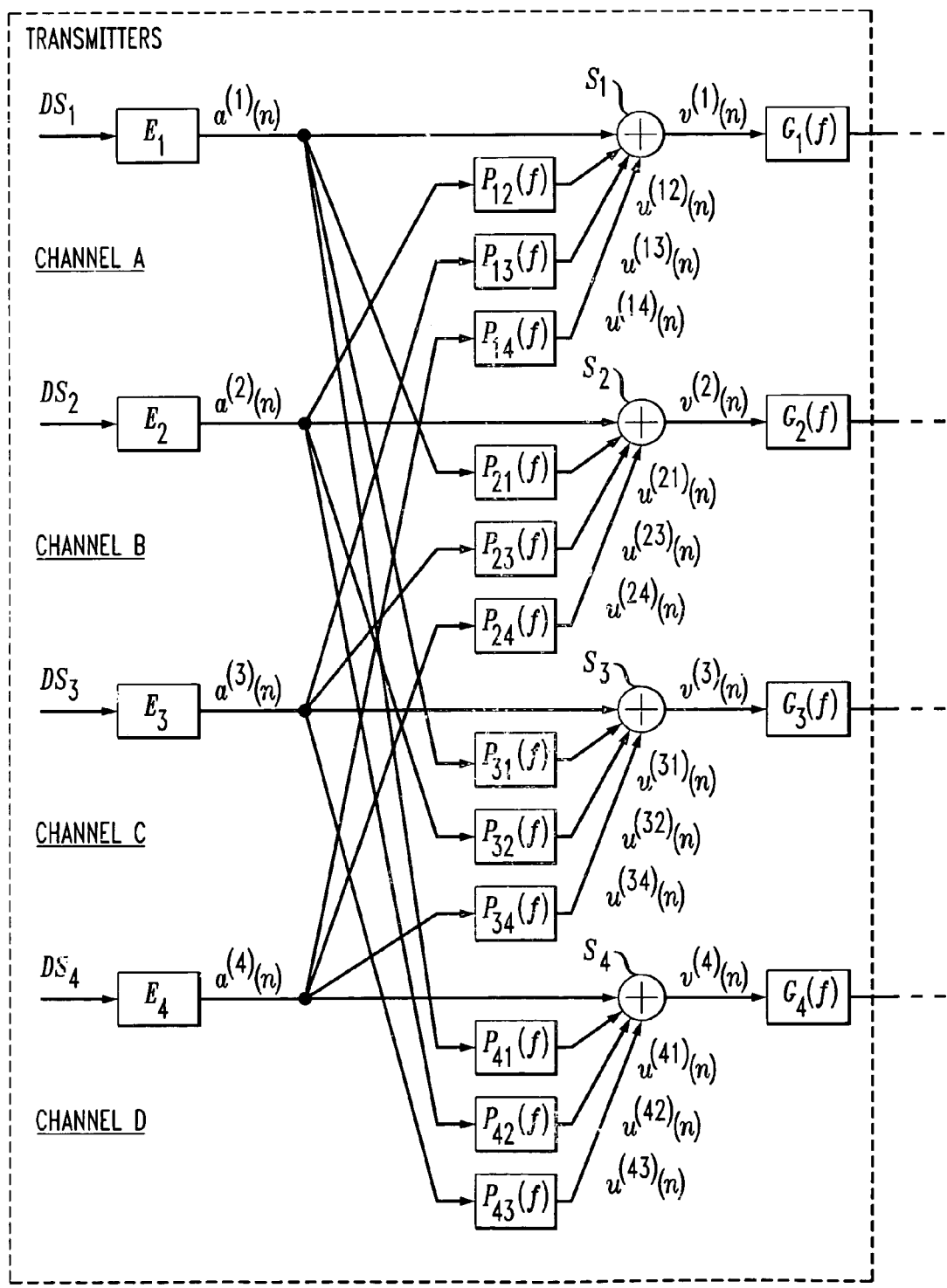
FIG. 4 depicts a high level block diagram of a multiple channel transmission system according to an embodiment of the invention.

FIG. 4 depicts a high level block diagram of a multiple channel transmission system according to an embodiment of the present invention. It will be appreciated by those skilled in the art that while the system of FIG. 4 is depicted as including four encoding, transmitting and receiving entities, more or fewer encoding, transmitting and/or receiving entities may be utilized.

Each of the four transmitters depicted in FIG. 4 (denoted as channels A through D) comprises an encoder E that receives a respective bitstream or data signal or DS to be transmitted. The output of each encoder E, illustratively a CAP symbol stream of the form $a^{(x)}(n)$, where x identifies the particular channel, is coupled to a corresponding summer S and to the input of a pre-coder function within each of the other channels.

Each of three pre-coder functions (one for every other channel to be processed) used in each channel is used to adapt the encoded symbol stream to a respective one of the three remaining channels. The pre-coder functions are denoted as $P_{xy}(f)$, where x denotes the channel that utilizes the output of the pre-coder function, and y denotes the channel providing input to the pre-coder function. Thus, for example, pre-coder $P_{12}(f)$ receives input from the encoder $E_2$ of the second channel (i.e., channel B) and provides output to the summer $S_1$ of the first channel (i.e., channel A).

Each summer S receives the output of its respective encoder E, as well as the output of a respective pre-encoder function ($P_{12}(f)$, $P_{13}(f)$ and $P_{14}(f)$ in the case of channel A) from each of the three other transmission channels. The summer S sums the received signals to produce an output signal of the form $v^{(i)}(n)$, which is coupled to a transmit filter function G(f). The output of transmit filter function G(f) is propagated to a respective receiver via a respective communications channel.

Referring to channel A in the system of FIG. 4, the transmitter includes an encoder $E_1$ that produces an encoded symbol stream of the form $a^{(1)}(n)$ in response to a received data signal $DS_1$. The encoded symbol stream is provided to a summer $S_1$. The summer $S_1$ also receives three other signals provided by respective pre-coders. A first pre-coder $P_{12}(f)$ receives an encoded signal $a^{(2)}(n)$ produced by an encoder $E_2$ of the second transmitter. Similarly, the second $P_{13}(f)$ and third $P_{14}(f)$ pre-coders receive encoded signals from the third $E_3$ and fourth $E_4$ transmitters. Each of the pre-coders $P_{12}(f)$ through $P_{14}(f)$ provides a respective pre-coded output signal $u^{(12)}(n)$ through $u^{(14)}(n)$ to the summer $S_1$. The summer $S_1$ sums the encoded signal produced by the encoder $E_1$ and the signals produced by the three pre-coders to produce an output signal $V^{(1)}(n)$ that is coupled to the first transmitter filter $G_1(f)$. The output of the transmitter filter $G_1(f)$ is transmitted by a respective channel to a corresponding receiver $R_1(f)$.

The transmission channels are depicted as having various channel impairments H(f). Specifically, a transmission channel impairment $H_{11}(f)$ operates upon data transmitted via the first transmission channel. Similarly, a second channel impairment $H_{12}(f)$ represents the impairment to data within the first transmission channel caused by interference or cross-talk from the second transmission channel. A third impairment channel $H_{13}(f)$ represents the impairment to data within the first transmission channel caused by interference or cross-talk from the third transmission channel. A fourth impairment $H_{14}(f)$ represents the impairment to data within the first transmission channel caused by cross-talk or interference from the fourth transmission channel.

Each of the channel impairments $H_{11}(f)$ through $H_{14}(f)$ are depicted as being summed by a summer $SH_1$. It is noted that such summation does not actually exist as a discrete element; rather, the summation function $SH_1$ represents the impairments added to, or impressed upon, the first transmission channel via the various channel impairment sources. The output of the first transmission channel is provided to a first receiver.

Each of the channel receivers (A–D) comprises a respective receiver equalizer R(f), a slicer or decision device BS, a subtractor or differencer D and an adaptation algorithm AA implemented using a controller or other computing device.

Each of the respective receiver equalizers $R_1(f)$ to $R_4(f)$ has a transfer function that is optionally modified by a respective adaptation algorithm in response to an error signal. For example, receiver $R_1(f)$ of channel A has a transfer function that is adapted in response to a control signal $CON_1$ produced by an adaptation algorithm $AA_1$. The adaptation algorithm may be implemented using, for example, a computing or data processing device comprising, illustratively, a microprocessor, a memory, input/output circuitry, and support circuitry. Computer executable instructions stored within the memory and executed by the processor implement the steps necessary to effect the adaptation algorithm.

Each of the slicers or decision devices $BS_1$ through $BS_4$ receives an equalized signal from its respective receiver equalizer $R_1(f)$ through $R_4(f)$ and operates in a known manner to produce at its output a signal of the form $â^{(x)}(n)$, where x represents the channel number. The output signal produced by the slicer BS should be substantially the same as the output signal produced by the encoder E at the transmitter. Differences between the actual signal produced by the bit slicer BS and the actual signal produced by the encoder E represent errors caused by, for example, channel impairments, such as previously discussed. Some of these errors may be reduced by adapting the operating parameters of the receiver equalizer R(f) However, other errors (especially those caused by interchannel interferences) are preferably addressed using the pre-coder function of transmitters constructed according to the principles of the present invention.

In the exemplary embodiments discussed herein, the transmitters use Carrierless Amplitude and Phase (CAP) modulation, though QAM or other encoding technology may be employed. Each transmitter has an independent data source generating, illustratively, 4 bits at every symbol interval. The encoder maps the 4 bits of data into complex symbols within a 16-point CAP/QAM transmitter. The encoded symbol stream is then passed through a transmit shaping filter G(f) to the channel. The CAP shaping filter is implemented as a complex input, complex coefficient, real output FIR filters whose real part (in-phase) and imaginary part (quadrature) of the impulse response form a Hilbert pair. The shaping filter has a passband square-root raised cosine characteristics with an equivalent center frequency of, illustratively, 16 MHz. The transmitter has an equivalent symbol rate of, illustratively, 12.96 Mbaud/s. It is noted that these specific parameters are intended to illustrate a specific example of an embodiment of the invention. Those skilled in the art and informed by the present disclosure will be able to devise other examples.

In the embodiment of FIG. 4, information necessary in establishing the operating parameters of the pre-coders associated with each of the transmission channels is determined by adapting the pre-coder operating parameters and measuring, at a respective receiver, a quality of an encoded signal processed thereby. For example, by monitoring a bit error rate and/or other error indicia, a receiver may provide data to a transmitter suitable for determining pre-coder parameters such that the bit error rate (BER), symbol error rate and/or other error indicia may be favorably adapted. The pre-encoders are operationally modified by adapting the pre-encoded matrix or matrices used to implement the various equations discussed above.

Figure 5:
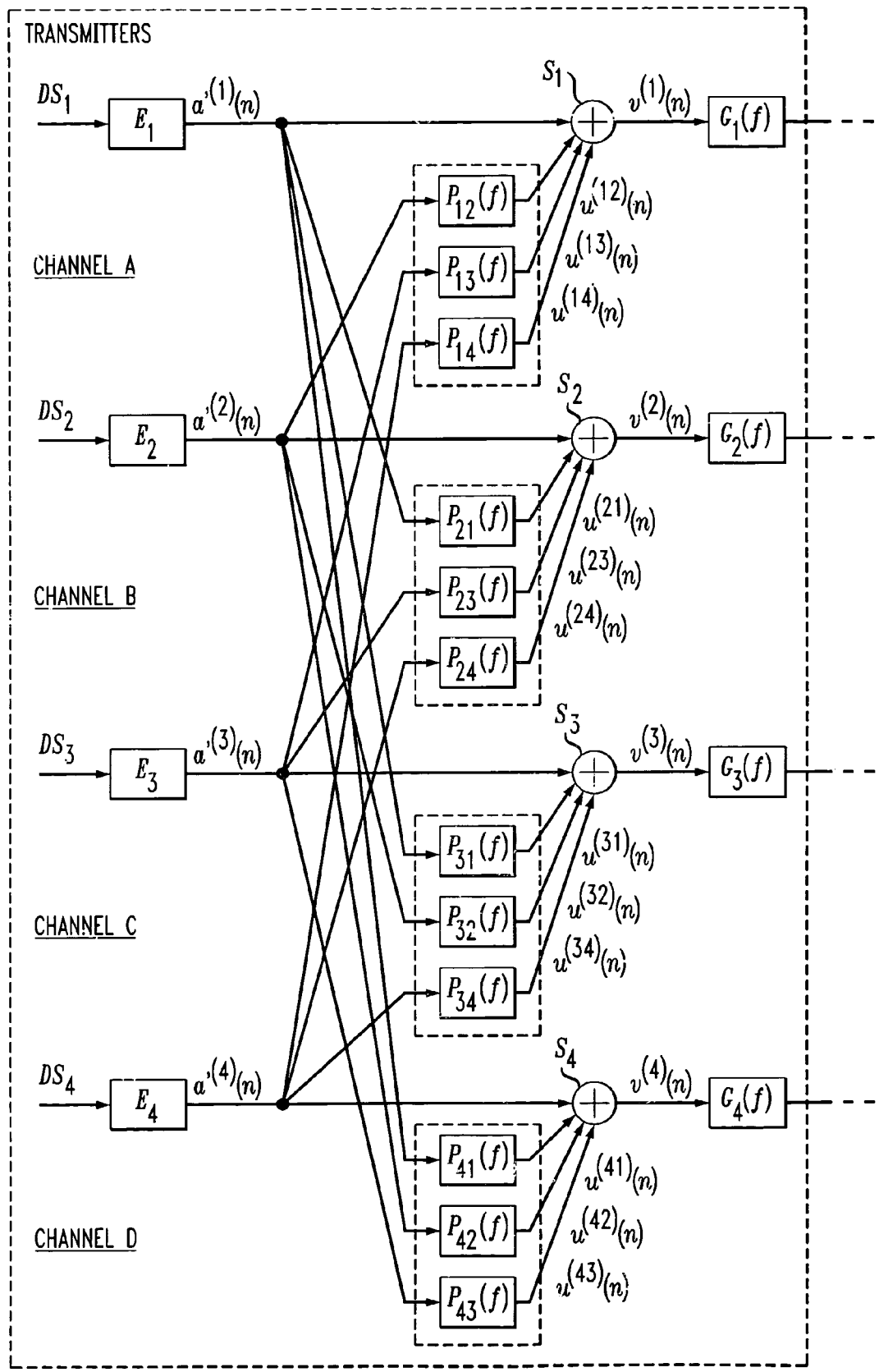
FIG. 5 depicts a high level block diagram of an alternate embodiment of the transmission system of FIG. 4.

In a preferred embodiment of the invention, the initial pre-coder operating parameters are determined entirely at the respective receivers. Specifically, FIG. 5 depicts a high level block diagram of the multiple channel transmission system of FIG. 4 further modified to include receiver side pre-coders. In one embodiment of the invention, the system of FIGS. 4 and 5 operate in a training mode as depicted with respect to FIG. 5, followed by a normal operating mode as depicted by FIG. 4. The system of FIG. 5 differs from the system of FIG. 4 in that each of the receivers within the system of FIG. 5 further comprises three respective pre-coders and summing means adapted to summing the output of the respective pre-coders and a received signal. In addition, the adaptation algorithms AA of the respective receivers are modified to enable to adaptation of pre-coder matrix or matrices for the receiver pre-coders such that in a training mode the receiver may itself rapidly determine at least an initial, if not optimal, pre-coder operating parameter set for the transmitter-side pre-coders.

Referring now to FIG. 5, each of the encoders $E_1$ through $E_4$ provides a predetermined training sequence of the form $a^{t(i)}(n)$ to its respective receiver via its respective channel. The predetermined training sequence is known to each of the respective receivers. It is noted that the receiver equalizers R(f) may also be trained. However, the training of receiver equalizers is beyond the scope of the present invention, since such receiver equalizer training depends entirely upon the particular implementation of the receiver, and since the teachings of the present invention may be successfully employed using many different receiver equalizer implementations. Referring to FIG. 5, at each receiver a substantially identical predetermined training sequence of the form $a^{t(i)}(n)$ is coupled to the receiver differencer D. The training signal transmitted from the respective transmitter through the respective channel is received by the receiver equalizer R and coupled to a receiver summing element SR. Additionally, each of the three pre-coder elements representing channel impairments caused by each of the three other channels provide respective output signals (in response to respective input training sequence or matrix values) which are also coupled to the receiver summing element SR. The output of the receiver summer SR is provided to a differencing element D, where it is compared to the known predetermined training sequence. Difference data e(n) is coupled to the adaptation algorithm AA, which responsively adapts one or more of the pre-coder functions and/or the receiver function.

Thus, the initial mode discussed with respect to FIG. 5 enables each of the channel receivers to rapidly determine a pre-coder function suitable for reducing transmission channel impairments and channel cross-talk impairments. The amount of data to be processed to determine appropriate pre-coder operating parameters is significant, and that the latency inherent in transmitting error data, initial pre-coder parameters and the like from the receiver to the transmitter may also be time consuming. By implementing a receiver-side training process, and providing to the transmitter a relatively good estimate of transmission-side pre-coder parameters at one time (rather than incrementally as the error rates drop), the training time necessary to reduce transmission channel impairment is greatly reduced.

In a preferred embodiment, initial pre-coder parameters are determined at each receiver based upon the reception of a predetermined training sequence, per FIG. 5. After the initial pre-coder parameters are determined, the determined parameters are provided to the respective transmitters, where they are incorporated into the transmitter side pre-coder functions. In this manner, the transmitter-side pre-coders are rapidly trained to at least an initial state. Since channel impairment characteristics change over time, and since initial parameter selection intended to reduce channel impairments is likely to be imperfect, it is preferable to periodically update transmitter side pre-coder operating parameters, per FIG. 4.

Transmitter-side initial pre-coder operating parameters and/or new error data useful in determining pre-coder parameters is propagated back to the transmitter via in-band or out-of-band transmission means, such as known to those skilled in the art.

Discussion of Pre-Coder Operation

The pre-coders are modeled as complex input, complex output, symbol spaced FIRs. There are 12 pre-coders in this four-user system. Each pre-coder has, illustratively, three complex tap coefficients that are adaptive. To describe the detail of operation of the pre-coder, we first define a vector, as follows:

$$a^t(n)=[a(n),a(n-1),a(n-2)] \quad \text{(equation 8)}$$

as the vector of complex symbols in the delay line at the n-th sampling instant, and $$c^T(n)=[c_0(n),c_1(n),c_2(n)] \quad \text{(equation 9)}$$

as the vector of complex tap coefficient at the n-th sampling instant.

Using superscript (ij) to associate with the pre-coder $P_{ij}(f)$, the complex output of each pre-coder can be expressed in vector form as $$u^{(ij)}(n)=c^{(ij)T}(n)a^{(j)}(n) \quad \text{(equation 10)}$$

The inputs to the transmit shaping filters are $$v^{(1)}=a^{(1)}(n)+u^{(12)}(n)+u^{(13)}(n)+u^{(14)}(n)$$

$$v^{(2)}=a^{(2)}(n)+u^{(21)}(n)+u^{(23)}(n)+u^{(24)}(n)$$

$$v^{(3)}=a^{(3)}(n)+u^{(31)}(n)+u^{(32)}(n)+u^{(34)}(n)$$

$$v^{(4)}=a^{(4)}(n)+u^{(41)}(n)+u^{(42)}(n)+u^{(43)}(n) \quad \text{(equation 11)}$$

The tap coefficients of pre-coder $P_{ij}(f)$ are updated as $$c_0^{(ij)}(n+1)=c_0^{(ij)}(n)-\mu a^{(j)}(n-D)e^{(j)}(n-D)$$

$$c_1^{(ij)}(n+1)=c_1^{(ij)}(n)-\mu a^{(j)}(n-D-1)e^{(j)}(n-D-1)$$

$$c_2^{(ij)}(n+1)=c_2^{(ij)}(n)-\mu a^{(j)}(n-D-2)e^{(j)}(n-D-2) \quad \text{(equation 12)}$$

where $\mu$ is the update step size, $e^j(n)$ the complex error obtained at the slicer of receiver j by subtracting the transmitted symbol $a^j(n)$ from the sampled symbol $a^{t(j)}(n)$ at the receiver, and D is the delay in number of symbol intervals from the time $a^{(j)}(n)$ enters the pre-coder to the time the corresponding error is available at the slicer of receiver j. The various parameters may be determined using the least mean square (LMS) algorithm.

It is noted that symbol streams having relatively fewer amplitude levels may be initially communicated to the receiver. For example, in one embodiment initially communicated symbol streams comprise CAP signals having only four amplitude points. By communicating a CAP signal having fewer levels during a training period, the receiver 108 can process the received CAP signal in a shorter amount of time. In this manner, initial communications after system turn-up may be used to train the communication channels in a relatively coarse manner. Subsequent increasing CAP signal levels may be used to progressively "fine train" the channels. It will be appreciated by those skilled in the art that although a CAP signal having four points is described within the context of an initial training period, the invention can be readily modified to include more than or less than four points. Moreover, the invention can be modified to use other modulation schemes.

Each of the transmitted symbol streams is received by a respective receiver where it is processed to determine a deviance from an expected received symbol stream. The deviation from an expected symbol stream may be conveyed in terms of a mean square error in a preassigned wave shape or preassigned signal level. It is noted that other error-indicative parameters are well known to those skilled in the art and may be advantageously employed within the context of the present invention. Additionally, other error measurements directed towards deviations induced by problems other than far-end cross-talk may be employed. In any event, the different errors determined by the receivers are propagated back through the communication system to the transmitters.

In one embodiment, the difference error data associated with each of the one or more pre-coded symbol streams is evaluated to determine whether the amount of error or deviance determined by the respective receiver exceeds a desirable or threshold level. If the amount of error is not less than the desired/threshold level, then the corresponding pre-code matrix or matrices of the one or more symbol streams is responsively adapted. If the difference error data is less than the desired threshold level, then the signal level of at least one of the one or more symbol streams is increased. That is, in the case of a CAP symbol stream, the amplitude levels of the CAP signals are increased, thereby increasing the number of bits per symbol transmitted using the same symbol rate. Typically, increasing the number of amplitude levels of a CAP signal increases the likelihood of errors in the signal due to noise. However, proper adaptation of the pre-coder matrices compensates for these errors. Thus, in the case of the CAP symbol stream, the number of bits is increased from, for example, four bits to 8 bits, then 16 bits, then 32 bits, and so on until a maximum desired level is reached.

Figure 6:
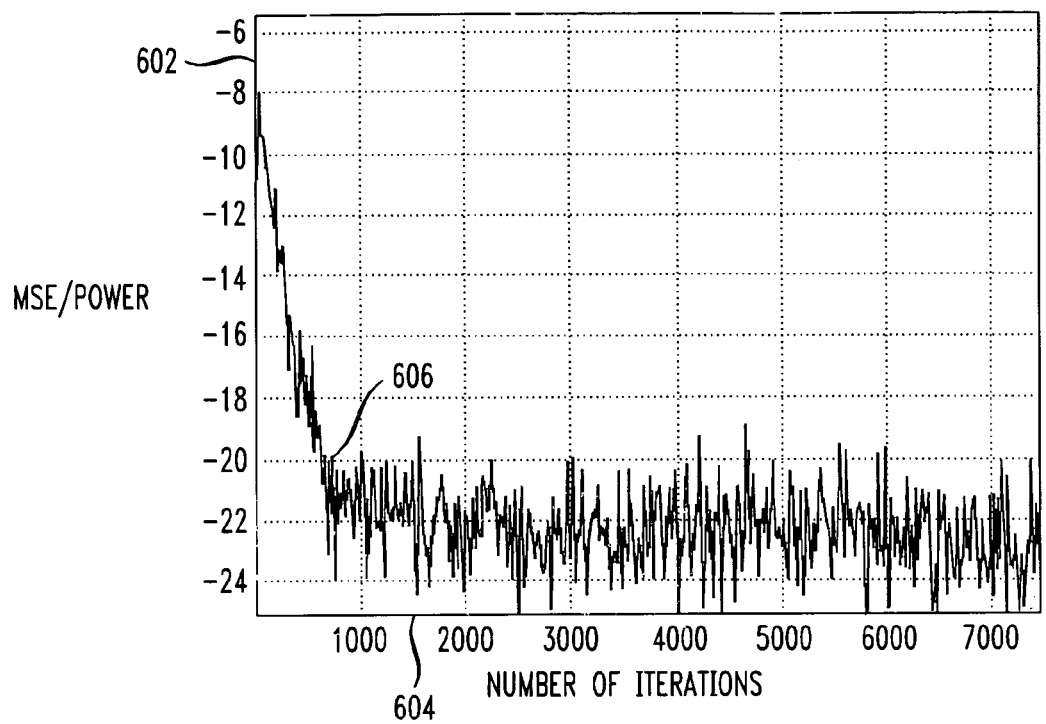
FIG. 6 comprises a graphical representation of a learning curve for a defined number of iterations according to the present invention.

FIG. 6 comprises a graphical representation of a learning curve for a defined number of iterations according to the present invention. specifically, a graph 600 shows a MSE/Power (axis 602) vs. a number of iterations (axis 604) during the transmitter 104 and receiver's 108 training period. A curve (plot 606) represents the ratio of mean squared errors to the average power at the summer vs. the number of iterations in which the pre-coder algorithm 500 is executed. The inverse of the ratio is the approximation of the signal to noise ratio. At the beginning of the training period, the gain of the cross-talk transfer functions has been increased to create a condition with an approximate signal to noise ratio of 8 dB. After about 2000 iterations, the SNR increases to about 22 dB. At about 7500 iterations, the signal to noise ratio reaches about 23.5 dB.

The inventors have determined that a signal to noise ratio of 23.5 dB will allow a virtually error free operation while a signal to noise ratio of 8 dB gives greater than 10% symbol error rate.

Figure 7:
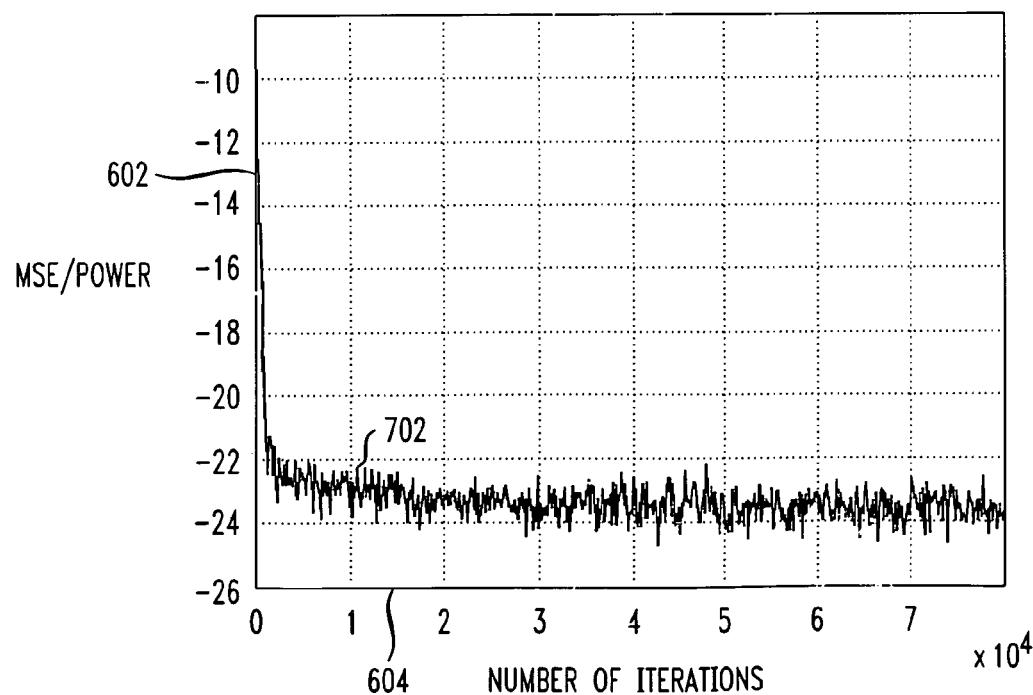
FIG. 7 comprises a graphical representation of the learning curve of FIG. 6 for a longer period of iterations.

FIG. 7 depicts a graphical representation of the learning curve of FIG. 6 for a longer period of iterations. Graph 700 shows the MSE/Power (axis 602) vs. the number of iterations (axis 604) during the transmitter 104 and receiver's 108 training period for 80,000 iterations. At the beginning of the training period, a curve (plot 702) begins with a signal to noise ratio of about 8 dB. However, unlike the curve (plot 606) that fell within a 5 dB spread from 1,000 to 8,000 iterations, the present curve (plot 702) averages a 2 dB spread from 10,000 to 80,000 iterations. Transmitter 104 and receiver 108 have ten times as much time to train. This results in greater accuracy for the training period.

Figure 8:
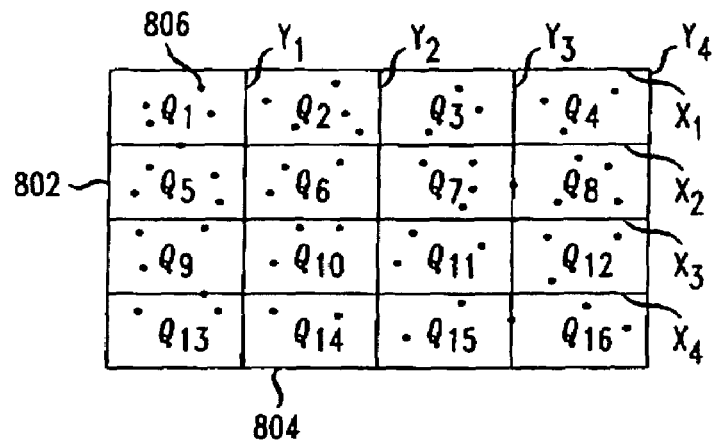
FIG. 8 depicts a constellation diagram of the communications system of FIG. 1 before pre-coding.

FIG. 8 depicts a constellation diagram of the communications system of FIG. 1 before pre-coding. Specifically, graph 800 comprises a Y axis 802 and a X axis 804. Extending perpendicularly from X axis 804 are five evenly spaced lines labeled $X_1$, $X_2$, $X_3$, $X_4$ and $X_5$. Similarly, five evenly spaced lines labeled $Y_1$, $Y_2$, $Y_3$, $Y_4$ and $Y_5$ extend perpendicularly from Y axis 802. The intersecting of lines $X_1$, $X_2$, $X_3$, $X_4$ and $X_5$ with lines $Y_1$, $Y_2$, $Y_3$, $Y_4$ and $Y_5$ creates 16 squares labeled Q1 up to Q16 respectively. The lines form a boundary circumscribing each square resulting in a decision boundary.

Disposed within the squares are points 806 representing data levels. The points are shown scattered in a random order throughout the 16 squares. Points falling within a square create a condition. However, points falling on the boundary of a square result in estimation errors because the receiver 108 will not know the correct square to assign the point to. Ideally, points 806 should be centered within each square. Graph 800 shows points disposed on the boundaries of square Q1, Q4, Q5, Q8, Q9, Q12 and Q16.

Figure 9:
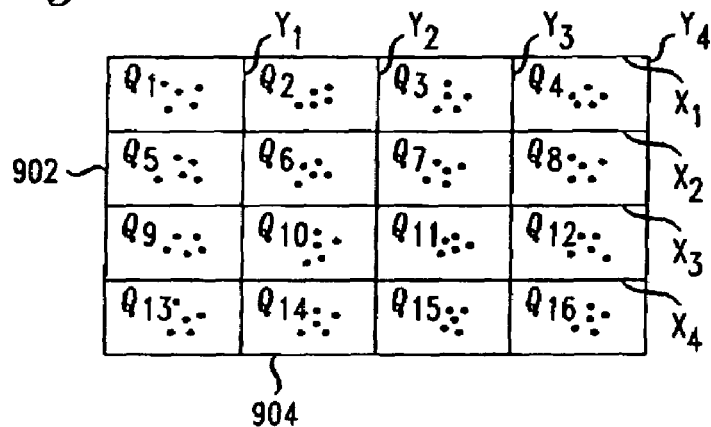
FIG. 9 depicts a constellation diagram of the communications system of FIG. 1 after pre-coding according to the present invention.

FIG. 9 depicts a constellation diagram of the communications system of FIG. 1 after pre-coding according to the present invention. Graph 800 comprises Y axis 802 and X axis 804. Extending perpendicularly from X axis 804 are lines $X_1$, $X_2$, $X_3$, $X_4$ and $X_5$. Similarly, five lines labeled $Y_1$, $Y_2$, $Y_3$, $Y_4$ and $Y_5$ extend perpendicularly from Y axis 802. The intersecting of lines $X_1$, $X_2$, $X_3$, $X_4$ and $X_5$ with lines $Y_1$, $Y_2$, $Y_3$, $Y_4$ and $Y_5$ creates 16 squares labeled Q1 up to Q16 respectively.

Graph 900 shows an equal number of points being grouped and centered within each of the sixteen squares. Estimation errors have been eliminated due to pre-coding the symbol stream.

Figure 10:
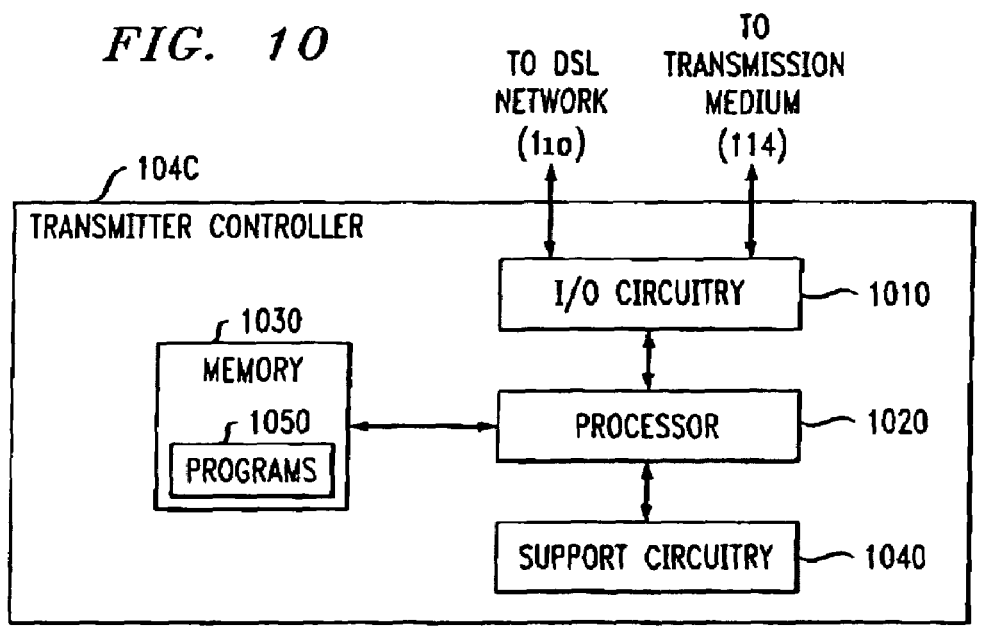
FIG. 10 depicts a high level block diagram of an embodiment of a controller suitable for use within a transmitter.

FIG. 10 depicts a high level block diagram of an embodiment of a controller suitable for use within a transmitter. Specifically, FIG. 10 depicts a high level block diagram of a transmitter 104 suitable for use in the communication system 100 of FIG. 1. The transmitter controller 104C comprises a microprocessor 1020 as well as memory 1030 for storing programs 1050 such as pre-coding method 500 which was described more fully above in a discussion of FIG. 5. The microprocessor 1020 cooperates with conventional support circuitry 1040 such as power supplies, clock circuits, cache memory and the like as well as circuits that assist in executing the software methods of the present invention.

The transmitter controller 104C also comprises input/output circuitry 1010 that forms an interface between the microprocessor 1020, the DSL network 110, second transmission medium 114, and other transmitter circuitry (not shown).

Although the transmitter controller 104C is depicted as a general purpose computer that is programmed to perform pre-coding, transmitting and receiving functions in accordance with the present invention, the invention can be implemented in hardware, in software, or a combination of hardware and software. As such, the processing steps described above with respect to the various figures are intended to be broadly interpreted as being equivalently performed by software, hardware, or a combination thereof. It will be appreciated by those skilled in the art that the transmitter controller 104C provides sufficient computer functionality to implement the invention as described above.

The above described invention provides adaptive pre-coding which is very suitable for multi-user transmission systems in which the transmitters are collocated and the receivers are separately located. This scenario fits the model of the typical downstream transmission in most systems such as VDSL system. That is, the transmission of data from the service provider to individual users. The pre-coding provides a very effective means of reducing or eliminating the effect of far-end-cross-talk in a multi-user environment.

Although various embodiments which incorporate the teachings of the present invention have been shown and described in detail herein, those skilled in the art can readily devise many other varied embodiments that still incorporate these teachings.

The invention claimed is:

1. Method for reducing cross-talk in a communication system comprising a plurality of transmitters for transmitting encoded data signals via respective communications channels to a plurality of receivers and receiving back matrix updating information, said method comprising the steps of:
    processing training data signals in a transmitter utilizing an initial pre-coding matrix to produce a first pre-coded training signal;
    transmitting said first pre-coded training signal on a first communication channel;
    receiving from the first communication channel the matrix updating information computed at a first receiver on the other end of the first communication channel, the matrix updating information having been computed utilizing the transmitted first pre-coded training signal and a second pre-coding matrix located at the first receiver, the second pre-coding matrix responsive to a second pre-coded training signal from at least a second receiver; and
    updating said initial pre-coding matrix based on said matrix updating information, whereby said updating tends to offset channel impairments within said first communication channel.

2. The method of claim 1, wherein the matrix updating information is generated in said first receiver based on an impairment indicative signal in response to a determination of a channel impairment level of said first communication channel.

3. The method of claim 2, wherein said impairment indicative signal is determined according to a least mean square (LMS) algorithm.

4. The method of claim 1, wherein signals propagated via each of said communications channels comprise a respective set of in-phase (I) and quadrature (Q) signals forming carrierless amplitude and phase (CAP) modulated signals.

5. The method of claim 1, wherein signals propagated via each of said communications channels comprise a respective set of in-phase (I) and quadrature (Q) signals forming quadrature amplitude modulated (QAM) signals.

6. Method for reducing cross-talk in a communication system comprising a plurality of transmitters for transmitting encoded data signals via respective communications channels to a plurality of receivers and receiving back matrix updating information, said method comprising the steps of:
    processing training data signals in a transmitter utilizing an initial pre-coding matrix to produce a first pre-coded training signal;
    transmitting said first pre-coded training signal on a first communication channel;
    receiving from the first communication channel the matrix updating information computed at a receiver on the other end of the first communication channel, the matrix updating information having been computed utilizing the transmitted first pre-coded training signal and a second pre-coding matrix located at the receiver; and
    updating said initial pre-coding matrix based on said matrix updating information, whereby said updating tends to offset channel impairments within said first communication channel, wherein signals propagated via each of said communications channels comprise a respective set of in-phase (I) and quadrature (Q) signals forming carrierless amplitude and phase (CAP) modulated signals, wherein said step of updating comprises the steps of:
    increasing an amplitude level of at least one respective set of said I and Q signals; and
    repeating said steps of processing, transmitting, and receiving until an impairment indicative signal level is less than a threshold level.

7. The method of claim 6, wherein the transmitter processes training data signals utilizing an initial pre-coding matrix in the transmitter.

8. The method of claim 6, wherein:
    the transmitter performs a step of selecting initial parameters for its respective initial pre-coding matrix prior to transmitting said first pre-coded training signal, said selected initial parameters tending to offset channel impairments of said first communication channel.

9. The method of claim 6, further comprising the step of training an equalizer to reduce channel-specific impairments within said first communication channel.

10. Apparatus for reducing cross-talk in a communications system comprising a plurality of transmitters for transmitting encoded data signals via respective communications channels to a plurality of receivers and receiving back matrix updating information, said apparatus comprising:
    at least one transmitter controller for processing training data signals utilizing an initial pre-coding matrix to produce a first pre-coded training signal;
    a near end transmitter for transmitting said first pre-coded training signal on a first communication channel;
    a near end receiver associated with the near end transmitter for receiving from the first communication channel the matrix updating information computed at a first receiver on the other end of the first communication channel, the matrix updating information having been computed utilizing the transmitted first pre-coded training signal and a second pre-coding matrix located at the first receiver, the second pre-coding matrix responsive to a second pre-coded training signal from at least a second receiver; and wherein said initial pre-coding matrix is updated in said at least one transmitter controller based on said matrix updating information, whereby said updating tends to offset channel impairments within said first communication channel.

11. Method for reducing cross-talk in a communication system comprising a plurality of receivers for receiving encoded data signals via respective communications channels from a plurality of transmitters and transmitting back matrix updating information, said method comprising the steps of:

receiving in a first receiver a first pre-coded training signal from a first communication channel;

processing the first pre-coded training signal in the first receiver utilizing a first pre-coding matrix located in the first receiver to produce the matrix updating information the first pre-coding matrix responsive to a second pre-coded training signal from at least a second receiver; and transmitting on the first communication channel the matrix updating information computed at the first receiver for utilization by a transmitter on the other end of the first communication channel to update a second pre-coding matrix located in the transmitter based on said matrix updating information.

12. The method of claim 11, further comprising the step of:

generating the matrix updating information in said first receiver based on an impairment indicative signal in response to a determination of a channel impairment level of said first communication channel.

13. The method of claim 12, wherein said impairment indicative signal is determined according to a least mean square (LMS) algorithm.

14. The method of claim 11, wherein signals propagated via each of said communications channels comprise a respective set of in-phase (I) and quadrature (Q) signals forming carrierless amplitude and phase (CAP) modulated signals.

15. The method of claim 11, wherein signals propagated via each of said communications channels comprise a respective set of in-phase (I) and quadrature (Q) signals forming quadrature amplitude modulated (QAM) signals.

16. The method of claim 12, further comprising the step of:

determining the impairment indicative signal in the first receiver using said first pre-coded training signal and a receiver copy of the first pre-coded training signal.

17. Method for reducing cross-talk in a communication system comprising a plurality of receivers for receiving encoded data signals via respective communications channels from a plurality of transmitters and transmitting back matrix updating information, said method comprising the steps of:

receiving in a receiver a first pre-coded training signal from a first communication channel:

processing the first pre-coded training signal in the receiver utilizing a first pre-coding matrix located in the receiver to produce the matrix updating information; and transmitting on the first communication channel the matrix updating information computed at the receiver for utilization by a transmitter on the other end of the first communication channel to update a second pre-coding matrix located in the transmitter based on said matrix updating information, wherein signals propagated via each of said communications channels comprise a respective set of in-phase (I) and quadrature (Q) signals forming carrierless amplitude and phase (CAP) modulated signals, wherein said step of updating comprises the steps of:

increasing an amplitude level of at least one respective set of said I and Q signals; and repeating said steps of receiving, processing, and transmitting until an impairment indicative signal level is less than a threshold level.

18. The method of claim 17, wherein each of said plurality of receivers processes a pre-coded training signal utilizing a first pre-coding matrix in each receiver.

19. The method of claim 17, wherein:

each of said plurality of receivers performs a step of selecting initial parameters for its respective first pre-coding matrix prior to receiving said pre-coded training signal, said selected initial parameters tending to offset channel impairments of said respective communications channels.

20. The method of claim 17, further comprising the step of training an equalizer to reduce channel-specific impairments within said first communication channel.

21. The apparatus of claim 10 wherein the near end transmitter comprises:

an encoder to convert information to be transmitted to an encoded symbol stream; and a pre-coder to adjust the output of the near end transmitter to offset channel impairments of transmitted signals.

22. The apparatus of claim 21 wherein the pre-coder receives at least one encoded symbol stream from an encoder associated with a different transmitter to adjust the output of the near end transmitter to offset cross-talk impairments of the transmitted signals.

23. The apparatus of claim 21, wherein the first receiver comprises:

a pre-coder to adapt the second pre-coding matrix based on the first and second pre-coded training signals, whereby an initial pre-coder operating parameter set for the near end transmitter pre-coder is determined.

24. The apparatus of claim 10, wherein:

the first receiver selects initial parameters for the second pre-coding matrix in a receiver side training process, said selected initial parameters are propagated back to the near end transmitter for updating the initial pre-coding matrix.

25. Apparatus for reducing cross-talk in a multiple transceiver communication system, comprising;

a controller for processing training data signals using an initial pre-coding matrix to produce a first pre-coded training signal;

a transmitter adapted to transmit the first pre-coded training signal on a first communication channel; and a receiver adapted to receive, from the first communication channel, matrix updating information computed at a first transceiver on the first communication channel, the matrix updating information having been computed using the transmitted first pre-coded training signal and a second pre-coding matrix located at the first transceiver, the second pre-coding matrix responsive to a second pre-coded training signal from a second transceiver, the controller updating the initial pre-coding matrix based on the matrix updating information, whereby the updating tends to offset channel impairments within the first communication channel.

26. The apparatus of claim 25 wherein the transmitter comprises:
an encoder to convert information to be transmitted to an encoded symbol stream; and
a pre-coder to adjust the output of the transmitter to offset channel impairments of transmitted signals.

27. The apparatus of claim 26 wherein the pre-coder receives at least one encoded symbol stream from an encoder associated with a different transmitter to adjust the output of the transmitter to offset cross-talk impairments of the transmitted signals.

28. The apparatus of claim 26, wherein the receiver comprises:
a pre-coder to adapt the second pre-coding matrix based on the first and second pre-coded training signals, whereby an initial pre-coder operating parameter set for the transmitter pre-coder is determined.

29. The apparatus of claim 25, wherein:
the receiver selects initial parameters for the second pre-coding matrix in a receiver side training process, said selected initial parameters are propagated back to the transmitter for updating the initial pre-coding matrix.

* * * * *